United States Patent [19]

Fujinaka

[11] Patent Number: 5,335,261
[45] Date of Patent: Aug. 2, 1994

[54] RADIO TELEPHONE APPARATUS

[75] Inventor: Akihiko Fujinaka, Kanagawa, Japan

[73] Assignee: Sony Corporation, Tokyo, Japan

[21] Appl. No.: 795,781

[22] Filed: Nov. 21, 1991

[30] Foreign Application Priority Data

Nov. 30, 1990 [JP] Japan .................................. 2-329617

[51] Int. Cl.⁵ .................... H04M 11/00; H04M 1/64; H04B 1/38
[52] U.S. Cl. ........................................ 379/58; 379/63; 379/67; 379/88; 455/89; 455/90
[58] Field of Search ................... 379/58, 63, 67, 88; 455/89, 90

[56] References Cited

U.S. PATENT DOCUMENTS

| | | | |
|---|---|---|---|
| 4,598,171 | 7/1986 | Hanscom et al. ............... | 379/80 |
| 4,945,557 | 7/1990 | Kaneuchi et al. ............... | 379/67 |
| 4,959,850 | 9/1990 | Marui ............................. | 379/63 |
| 4,961,212 | 10/1990 | Marui et al. ................... | 379/67 |
| 5,029,236 | 7/1991 | Yasuda et al. .................. | 379/58 |
| 5,042,063 | 8/1991 | Sakanishi et al. .............. | 379/58 |
| 5,148,471 | 9/1952 | Matroka et al. ................. | 379/58 |

*Primary Examiner*—Stephen Chin
*Assistant Examiner*—Vijay Shankar
*Attorney, Agent, or Firm*—Philip M. Shaw, Jr.

[57] ABSTRACT

A radio telephone comprising a main body enclosing a transmitting circuit and a receiving circuit; a handset removably mounted to the main body, the handset including a microphone electrically connected to the transmitting circuit and a speaker electrically connected to the receiving circuit; a voice recognition circuit for recognizing a voice input to the microphone and for performing a dialing operation based on the voice. An extension module is removably mounted on the main body. A mute switch, which also enables the voice recognition circuit, is removably connected to the main body, or to an extension module removably mounted on the main body, thus adding to the portability of the radio telephone.

10 Claims, 2 Drawing Sheets

RADIO TELEPHONE APPARATUS

BACKGROUND OF THE INVENTION

1. Field of the Invention

This invention relates to a portable or car-laden type radio telephone apparatus.

2. Description of Related Art

There has hitherto been proposed a portable or car-laden type radio telephone apparatus which is adapted for transmitting input voice information signals as electrical waves to a telephone exchange and receiving information signals transmitted as electrical waves from the telephone exchange for producing voice outputs.

With such a radio telephone apparatus, it has been proposed to initiate the identification of a destination of transmission of electrical waves, a so-called dialing operation, by voice.

Such a radio telephone apparatus includes a microphone device for sensing the initiating voice, and a voice recognition circuit. When set to the voice recognition mode following the hook-off operation, the radio telephone apparatus is in a state of waiting for entry of the destination-identifying voice, that is, in the state in which the voice inputted to a microphone device may be transmitted as electrical signals to the voice recognition circuit.

If, when the radio telephone apparatus is in the voice recognition mode, the destination-identifying voice is inputted to the microphone device, the voice recognition circuit proceeds to identify the destination by associating the information corresponding to the electrical signals transmitted from the microphone device with destination-related information stored in a memory. The voice recognition circuit then proceeds to controlling the transmitting circuit etc. of the radio telephone apparatus for effectuating the transmitting operation.

When the radio telephone apparatus is used as a car-laden type apparatus, it is necessary to carry out the operation of starting the hook-off operation and the voice recognition mode easily, e.g. without a laborsome operation of locating the operating buttons or the like.

For this reason, some of the radio telephone apparatuses provided with a voice recognition circuit are so constructed that the hook-off operation and the operation of starting the voice recognition mode are performed if any one of a plurality of pushbuttons, such as so-called ten-keys, is actuated for more than a predetermined time duration during non-use of the telephone apparatus.

On the other hand, some of the radio telephone apparatuses provided with a voice recognition circuit are also provided with a pushbutton switch, mounted at a position removed from the main body of the telephone apparatus and connected thereto by means of a current-conducting wire. The main body of such radio telephone apparatus is located near the driver's cabin within the automobile compartment. The pushbutton switch is provided at a position within the field of view of the driver in the driver's cabin, With this radio telephone apparatus, a hook-off operation and the operation of starting the voice recognition mode are performed upon actuation of the pushbutton switch.

However, the hook-off operation and the operation of starting the voice recognition mode cannot be performed quickly because it is necessary to operate the pushbutton for more than a predetermined time.

On the other hand, with the radio telephone apparatus having a pushbutton switch connected to the main body by means of the current-conducting wire, although the hook-off operation and the operation of starting the voice recognition mode may be effectuated quickly by actuating the pushbutton switch, there is a risk that, if the apparatus is used portably, the pushbutton switch will hinder smooth portability of the apparatus.

OBJECTS AND SUMMARY OF THE INVENTION

It is an object of the present invention to provide a radio telephone apparatus whereby the hook-off operation and the operation of starting the voice recognition mode may be performed easily and quickly.

It is another object of the present invention to provide a radio telephone apparatus in which, when the apparatus is used portably, a switch for effectuating the hook-off operation and the operation of starting the voice recognition mode does not hinder portability of the apparatus.

The radio telephone apparatus of the present invention includes a microphone device for sensing a voice, a voice recognition circuit for recognizing at least a desired call. destination input by means of the microphone device; and a switch which if activated when the radio telephone is in a talk state, disconnects the microphone from a voice transmitting circuit, and if activated when the radio telephone is not in a talk state, enables the voice recognition circuit.

With the present radio telephone apparatus, the voice recognition start switch for causing the voice recognition circuit to start its operation of voice recognition is removably connected to the main body or to an extension module mounted on the main body.

With the present radio telephone apparatus, the mute switch for muting the transmitted voice during talk functions as a switch for causing the voice recognition circuit to start the operation of the voice recognition during the time the apparatus is not in the talk state, so that, when the mute switch is operated when the apparatus is not in the talk state, the operation of voice recognition is initiated.

In addition, with the present radio telephone apparatus, since the voice recognition start switch for causing the voice recognition circuit to start the operation of voice recognition is removably connected, the voice recognition start switch may be disconnected for transportation of the apparatus.

DETAILED DESCRIPTION OF THE PREFERRED EMBODIMENT

Figure 1:
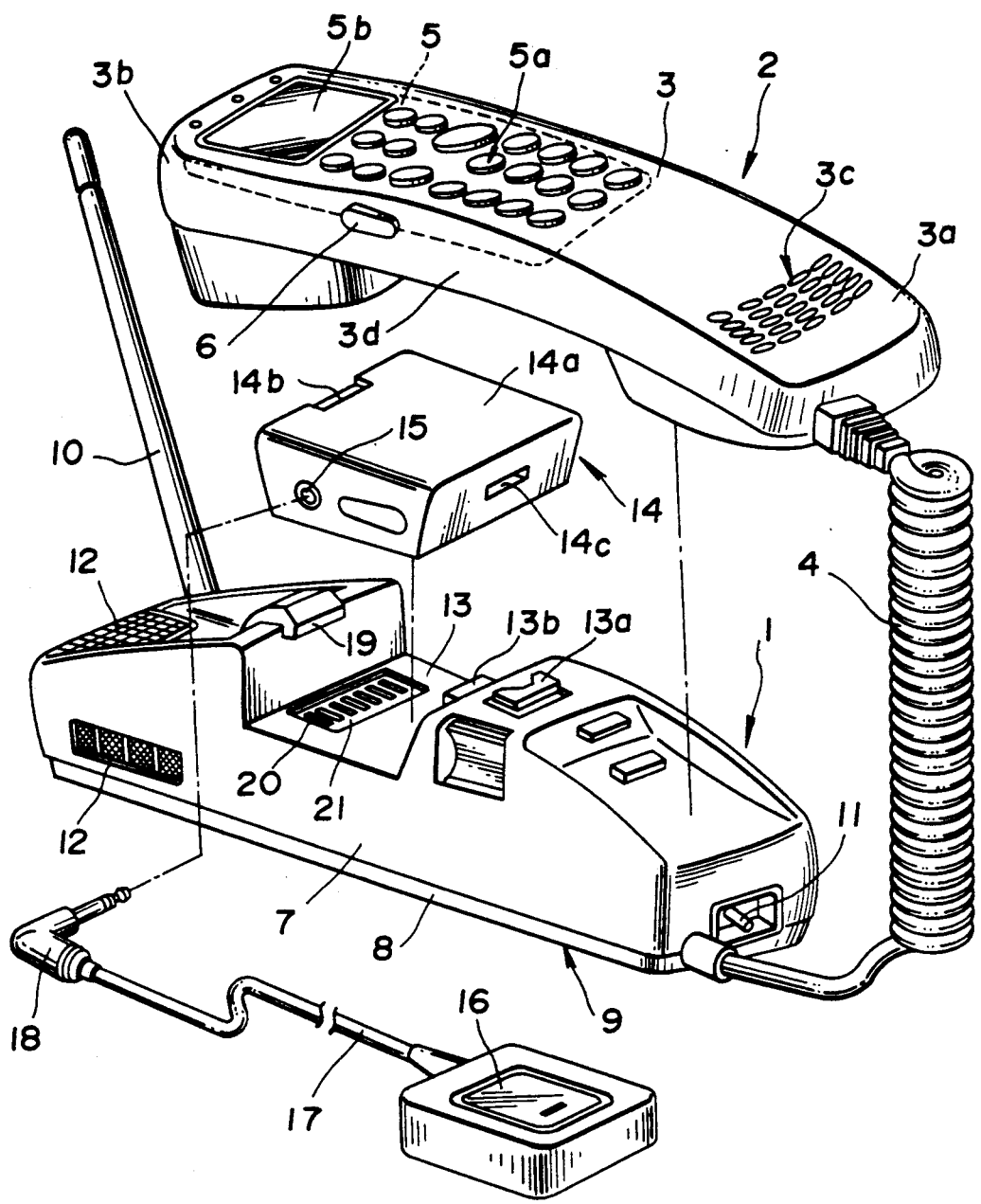
FIG. 1 is a perspective view of a radio telephone apparatus according to the present invention.

Referring to the drawings, an illustrative embodiment of the present invention will be explained in detail.

The radio telephone apparatus of the present invention is adapted for talking to a called party, who has another telephone apparatus, the called party being designated by a dialing operation. A dialing operation is executed by transmitting input voice information signals, translated to electrical waves, to a telephone exchange, and by receiving information signals transmitted as electrical waves from the telephone exchange, translated and outputted as voice signals.

Referring to FIG. 1, the radio telephone apparatus includes a main body 1, or cradle and a handset 2 removably mounted on the main body 1. The handset 2 is placed on the upper surface of the main body 1 during non-use of the apparatus.

The handset 2 is provided with an acoustic-electric transducer unit for converting voice signals into electrical signals and an electric-acoustic transducer unit for converting electrical signals into voice signals. The handset is adapted for exchanging information signals as electrical signals between it and the main body 1.

The main body 1 is provided with a transmitting circuit and a receiving circuit and has the function of transmitting and receiving the information signals as electrical waves. The main body 1 is also provided with other extension modules, such as a direct current power source unit, an A/C adapter as a rectifier-transformer device, an extension memory unit, a voice recognition unit including a voice recognition circuit, a voice synthesizer, and other function extension devices, connected to the transmitting and receiving circuits, as will be explained subsequently.

The present radio telephone apparatus is so designed that, if the voice recognition unit is provided as the extension module in the present radio telephone apparatus, and the apparatus is set to the voice recognition mode, the above mentioned dialing operation, that is, the operation of designating the destination of transmission of the electrical waves by voice, is performed. Such designation of the destination of transmission of the electrical waves by the voice is achieved by associating information concerning a number or a number or the information concerning the name recognized by the voice recognition unit with information concerning the destination of transmission, previously stored in a memory device.

As shown in FIG. 1, the handset 2 has a handset proper 3 provided with a grip 3d on both ends of which a mouth piece 3a and an ear piece 3b are formed. The handset proper 3 is so designed that a user of the radio telephone apparatus may hold the grip 3d with the mouth piece 3a close to his or her mouth and with the ear piece 3b close to his or her ear. A number of voice-transmitting through-holes, not shown, are formed in portions of the mouth piece 3a and the ear piece 3b lying close to the user's mouth and ear. On the surface of the mouth piece 3a opposite to its surface facing the user's mouth are formed a number of voice-transmitting through-holes 3c.

Within the mouth piece 3a of the handset proper 3 is mounted a microphone device, or acoustic-electric transducer unit. Within the ear piece 3b of the handset proper 3 is mounted a speaker device, or electric-acoustic transducer unit. The electrical signals transmitted from the microphone device and sent to the speaker device are received by and transmitted from, respectively, the main body 1 over a signal cable 4.

The grip 3d has an inputting device 5 for identifying a destination of information signals transmitted as electrical waves and generating prescribed signals for selecting an operating mode or the like. This inputting device has a signal processing unit (CPU), and a plurality of pushbuttons 5a and a display device 5b facing the outer side of the grip 3d. The inputting device 5 is designed for transmitting the prescribed signals to the main body 1 over signal cable 4. The inputting device 5 is responsive to the depression of the pushbuttons 5a to transmit signals corresponding to hook-on, hook-off and dialing operations to the main body 1.

The handset 2 is also provided with a switch 6 of a pushbutton type on a lateral surface of the grip 3d. The mounting position of the switch 6 is so selected that the switch 6 may be actuated easily when the grip 3d is held by hand.

Activation of the switch when the radio telephone is in a talk state disconnects the microphone device from the voice transmitting circuit and activation of the switch when the radio telephone is not in a talk state enables the voice recognition circuit.

As shown in FIG. 1, the main body 1 is provided with an outer casing 9 composed of an upper half 7 and a lower half 8 abutted and connected to each Other.

A chassis base plate, not shown, is provided within the outer casing 9 of the main body 1 so as to be supported by the upper and lower halves 7 and 8. The chassis base plate is formed integrally by aluminum diecasting. A printed circuit board, not shown, is mounted on the chassis base plate. A variety of electronic devices for mounted on the printed circuit board for certain electronic circuits, such as a signal processing unit (CPU), an A/D converter, a D/A converter, memories (RAM and/or ROM), detectors or amplifiers, The printed circuit board also includes a transmitting circuit for processing electrical signals transmitted over cable 4 from the microphone device of the handset 2 and transmitting the processed signals and the signals from the inputting device 5 to a telephone exchange as electrical waves by means of an antenna 10 provided on the main body 1 or by means of an external antenna device, not shown.

The printed circuit board additionally includes a receiving circuit for receiving information signals transmitted as electrical waves from the telephone exchange by means of either the external antenna device or antenna 10, and for processing the received information signals in a predetermined manner before transmission thereof to the speaker device of the handset 2.

Some of the memories on the printed circuit board are for storing information concerning the destination of electrical waves transmitted from the radio telephone device, and other information. The information concerning the destination includes the names of be called parties and corresponding telephone numbers.

The transmitting circuit, the receiving circuit and the memories are operated under control of a signal processing circuit, responsive to actuation of the inputting device 5 and the muting switch 6.

A socket 11 is connected to the electronic circuits on the printed circuit board in the main body 1, for facing the outside of the outer casing 9. The socket 11 may be used to connect the telephone to an external power source, not shown.

Heat radiator openings 1 are formed on the outer casing 9 for dissipating the heat generated from the electronic circuit formed on the main body 1.

An extension module attachment section 13 is formed at the middle of the upper surface of the upper half 7 for removably attaching the one or more extension module(s) 14. The radio telephone of FIG. 1 has only one extension module. The attachment section 13 is formed as a recess corresponding in size to the extension module 14.

The extension module 14 has a substantially rectangular casing 14a within which a variety of devices or circuits are accommodated. A retention recess 14b is formed at an upper edge of a lateral surface of the casing 14a of the extension module 14, whilst an engaging recess 14c is formed at the middle of the other lateral surface of the casing 14a. The latter lateral surface of the casing 14a is tapered towards the bottom so that the lower side of the casing 14a is slightly smaller than its upper side.

On one lateral surface of the extension module attachment section 13 facing the retention recess 14b is provided an extension module retention lug 19 in register with the retention recess 14b. On the other lateral surface of the extension module attachment section 13 facing the engaging recess 14c is provided an engaging pawl 13b in register with the engaging recess 14b so as to be removed from or inserted into the interior space of the upper half 7. The engaging pawl 13b is biased by a spring, not shown, provided within the interior of the outer casing 9 of the main body 1, biased in the direction of opposite insertion into the extension module attachment section 13. The engaging pawl 13b is inserted into the interior of the upper half 7, against the bias of the spring, by thrusting and shifting a release lever 13a provided on the upper surface of the upper half 7.

To mount extension module 14 to the extension module attachment section 13, the retention lug 19 is engaged to the retention recess 14b and the engaging pawl 13b is engaged to the engaging recess 14c.

When the extension module 14 from the extension module attachment section 13, the engaging pawl 13b is receded into the interior of the upper half 7 with the aid of the release lever 13a, thus disengaging the engaging pawl 13b from the engaging recess 14c.

On the underside of the extension module 14, there are provided a number of connection terminals, not shown, for establishing electrical connection between the devices or circuits of the extension module 14 and the circuits and circuit devices within the main body 1.

The number and the positions of these terminals differ with the types of the circuits and devices within the extension module 14. If, for example, the extension module 14 is a direct current power device or an A/C adapter having enclosed dry cells or charging type batteries, two terminals, that is a plus terminal and a ground terminal, are provided. If, for example, if the extension module is an extension memory, voice recognition device or a voice synthesizer, up to 20 terminals are provided.

The main body 1 is also provided with connection terminals 20 corresponding to the connection terminals of the extension module(s). The connection terminals 20 of the main body 1 are provided with 20 juxtaposed terminal pins and are formed on the printed circuit board enclosed within the main body 1. The terminals 20 are exposed to outside via a connection through-hole 21 formed on the bottom surface of the extension module attachment section 13.

The connection terminals of the extension module(s) 14 and the connection terminals 20 of the main body 1 are so designed that, when the extension module(s) 14 are mounted in the extension module attachment section 13, the mating terminals are engaged, by pressure, to one another.

If the extension module 14 is or contains a voice recognition device, a voice recognition start switch 16 for starting the voice recognition mode, that is the mode of executing the voice recognition by the voice recognition. circuit, is removably attached to the voice recognition device. The voice recognition start switch 16 may be a pushbutton switch connected to a connection jack 15 provided on a lateral surface of the voice recognition device by means of a current conducting wire 17 and a connection plug 18. The connection jack 15 is connected to the signal processing circuit within the main body 1 by means of the connection terminals 20 of the extension module 20. Thus the voice recognition start switch 16 is connected to the signal processing circuit of the main body 1 when of the voice recognition device is in position on the main body 1.

If the present radio telephone apparatus is to be used as a car-laden type apparatus, the voice recognition start switch 16 may be provided at any position permitting facilitated operation, such as at a position within the field of view of the driver.

The radio telephone apparatus is in voice recognition mode whenever the radio telephone apparatus is not in call or talk mode. The radio telephone apparatus can not be in call or talk state if the hook-off operation is not made or, until the hook-off operation has been performed, the dialing operation has not been performed and hence the electrical waves corresponding to the information signals are not transmitted or received.

The hook-off operation is performed by actuating a pushbutton of the inputting device 5 or by lifting the handset 2 off the main body 1.

Then, to start the voice recognition mode, the mute switch 6 or the voice recognition start switch 16 is actuated.

Figure 2:
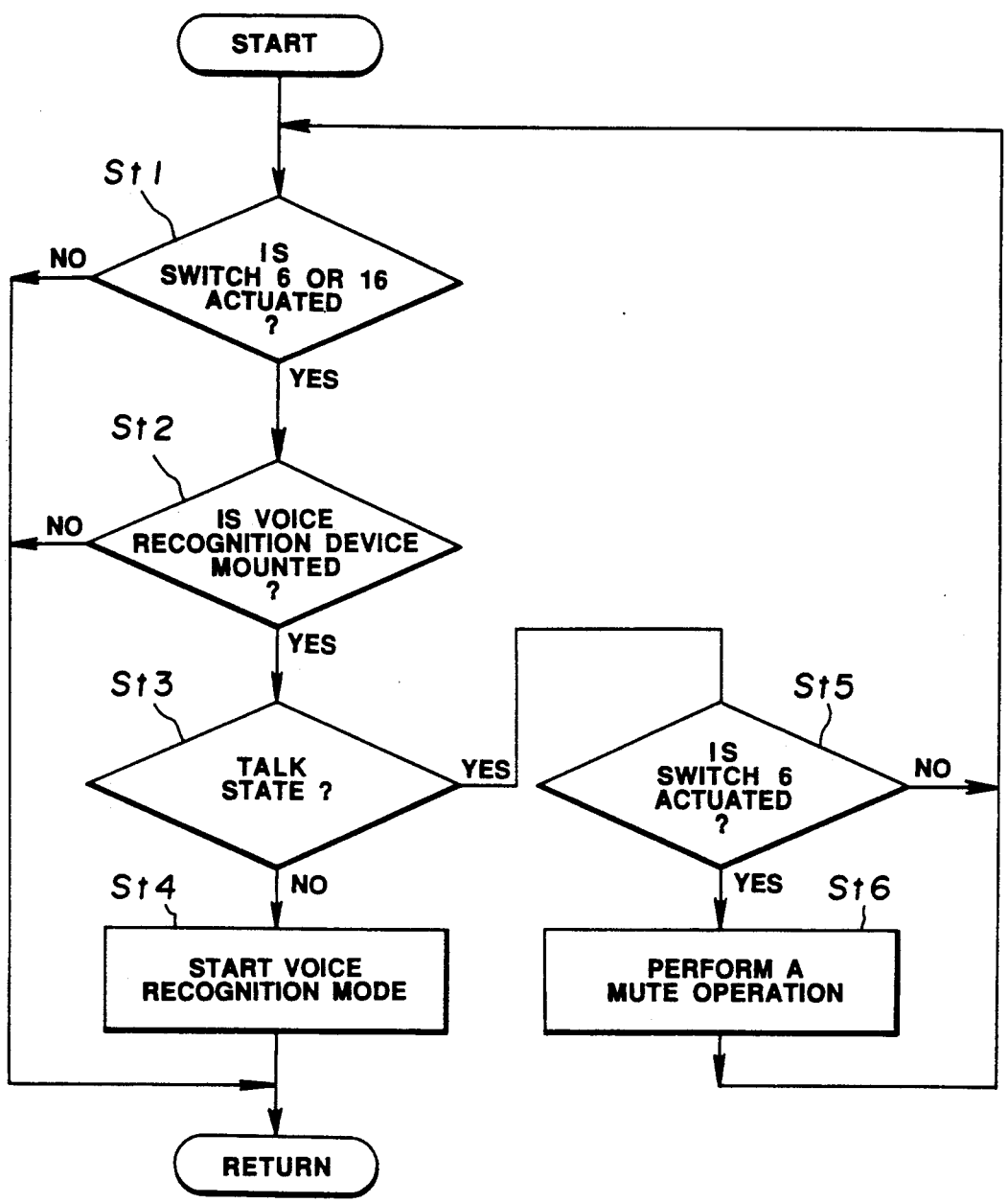
FIG. 2 is a flow chart illustrating an operation of initiating a voice recognition mode of a signal processing apparatus constituting the radio telephone apparatus shown in FIG. 1.

Referring to the flow chart of FIG. 2, the signal processing circuit enclosed within the main body I checks to see at step st1 if the mute switch 6 or the voice recognition start switch 16 is actuated. If either of the switches 6 and 16 is actuated, the signal processing circuit proceeds to step st2. If neither is actuated, the signal processing circuit terminates the routine (return)

At step st2, the signal processing circuit checks for the presence of the voice recognition device. If the voice recognition device is present, the signal processing circuit proceeds to step st3. Otherwise, the signal processing circuit, terminates the routine.

At step st3, the signal processing circuit checks to see if the radio telephone apparatus is in the call or talk state. If the telephone apparatus is in the talk state, the signal processing circuit proceeds to step st5. Otherwise, the signal processing circuit proceeds step st4.

At step st4, the signal processing circuit executes a hook-off operation; starts the voice recognition mode, and terminates the routine. In voice recognition mode, the signal processing circuit listens for recognizable voice patterns from the microphone device. A recognized pattern indicates a name which is then associated with a destination of transmission, i.e. a corresponding telephone number, or the voice pattern directly indicates a telephone number.

After voice pattern recognition is made in this manner, the signal processing circuit performs a dialing operation, based on the destination of transmission, as discussed above.

At step st5, the signal processing circuit checks to see if the switch 6 has been actuated, The signal processing circuit proceeds to step st6 if the switch 6 has been actuated, and reverts to step st1 if otherwise.

At step st6, the signal processing circuit initiate muting, and then reverts to step st1. While muting, the signal processing circuit continues to receive electrical waves and produce voice output, but interrupts transmission of the electrical waves corresponding to the voice inputted to the microphone device. The muting operation is continued until the activation of the muting switch is terminated.

What is claimed is:

1. A radio telephone comprising:
   a main body enclosing a transmitting circuit and a receiving circuit;
   a handset removably mounted to the main body, the handset including a microphone electrically connected to the transmitting circuit and a speaker electrically connected to the receiving circuit;
   a voice recognition circuit for recognizing a voice input to the microphone and for performing a dialing operation based on the voice; and
   a switch which, if activated when the radio telephone is in a talk state, disconnects the microphone from the transmitting circuit, and if activated when the radio telephone is not in a talk state, enables the voice recognition circuit.

2. The radio telephone as claimed in claim 1 wherein the switch is removably connected to the main body.

3. The radio telephone as claimed in claim 2 wherein the switch is removably connected to a connection jack on the main body by a current-conducting wire and a connection plug.

4. The radio telephone as claimed in claim 1 wherein the voice recognition circuit is enclosed in an extension module removably mounted on the main body.

5. The radio telephone as claimed in claim 4 wherein the extension module is mounted to the main body by interengaged retention means.

6. The radio telephone as claimed in claim 4 wherein when the extension module is mounted to the main body, each of a plurality of connection terminals on the extension module are electrically connected to separate ones of a plurality of connection terminals on the main body.

7. The radio telephone as claimed in claim 4 wherein the switch is removably mounted to the extension module.

8. A radio telephone comprising:
   a main body enclosing a transmitting circuit and a receiving circuit;
   a handset removably mounted to the main body, the handset including a microphone electrically connected to the transmitting circuit and a speaker electrically connected to the receiving circuit;
   a voice recognition circuit for recognizing a voice input to the microphone and for performing a dialing operation based on the voice, the voice recognition circuit being enclosed in an extension module removably mounted on the main body;
   a switch removably connected to the extension module for enabling the voice recognition circuit.

9. The radio telephone as claimed in claim 8 wherein the extension module is mounted to the main body by interengaged retention means.

10. The radio telephone as claimed in claim 8 wherein when the extension module is mounted to the main body, each of a plurality of connection terminals on the extension module are electrically connected to separate ones of a plurality of connection terminals on the main body.

* * * * *